United States Patent [19]

Hourton

[11] Patent Number: 4,686,330
[45] Date of Patent: Aug. 11, 1987

[54] TELEPHONE SWITCHING SYSTEM
[75] Inventor: Jean-Jacques Hourton, Paris, France
[73] Assignee: Telecommunications Radioelectriques et Telephoniques TRT, Paris, France
[21] Appl. No.: 562,337
[22] Filed: Dec. 16, 1983
[30] Foreign Application Priority Data Dec. 22, 1982 [FR] France .................. 82 21566

[51] Int. Cl.[4] ............... H04Q 3/545; H04Q 11/04
[52] U.S. Cl. .................................. 379/269; 370/88
[58] Field of Search ............. 370/88, 58, 63, 66; 179/18 ES

[56] References Cited

U.S. PATENT DOCUMENTS 3,883,693  5/1975  Moore ........................... 370/88
3,890,471  6/1975  Hachenburg .................. 370/88
3,925,621 12/1975  Collins et al. ................ 370/88 X

OTHER PUBLICATIONS

"Speech-Path Selection and Inter-Processor Signalling in a Load-Shared Distributed Switching System", M. Akiyama et al., International Switching Symposium, Paris, France, 7-11 May 1979, pp. 619-626.

Primary Examiner—Thomas W. Brown
Attorney, Agent, or Firm—Thomas A. Briody; William J. Streeter; Leroy Eason

[57] ABSTRACT

A telephone switching system is formed on the basis of a switching network intended to switch message information by interconnecting input circuits provided with programmed-logic units. Among these programmed-logic units are incorporated for the purpose of transmitting control information connecting circuits formed by Pierce loops in which control circuits of the switching network are inserted.

9 Claims, 10 Drawing Figures

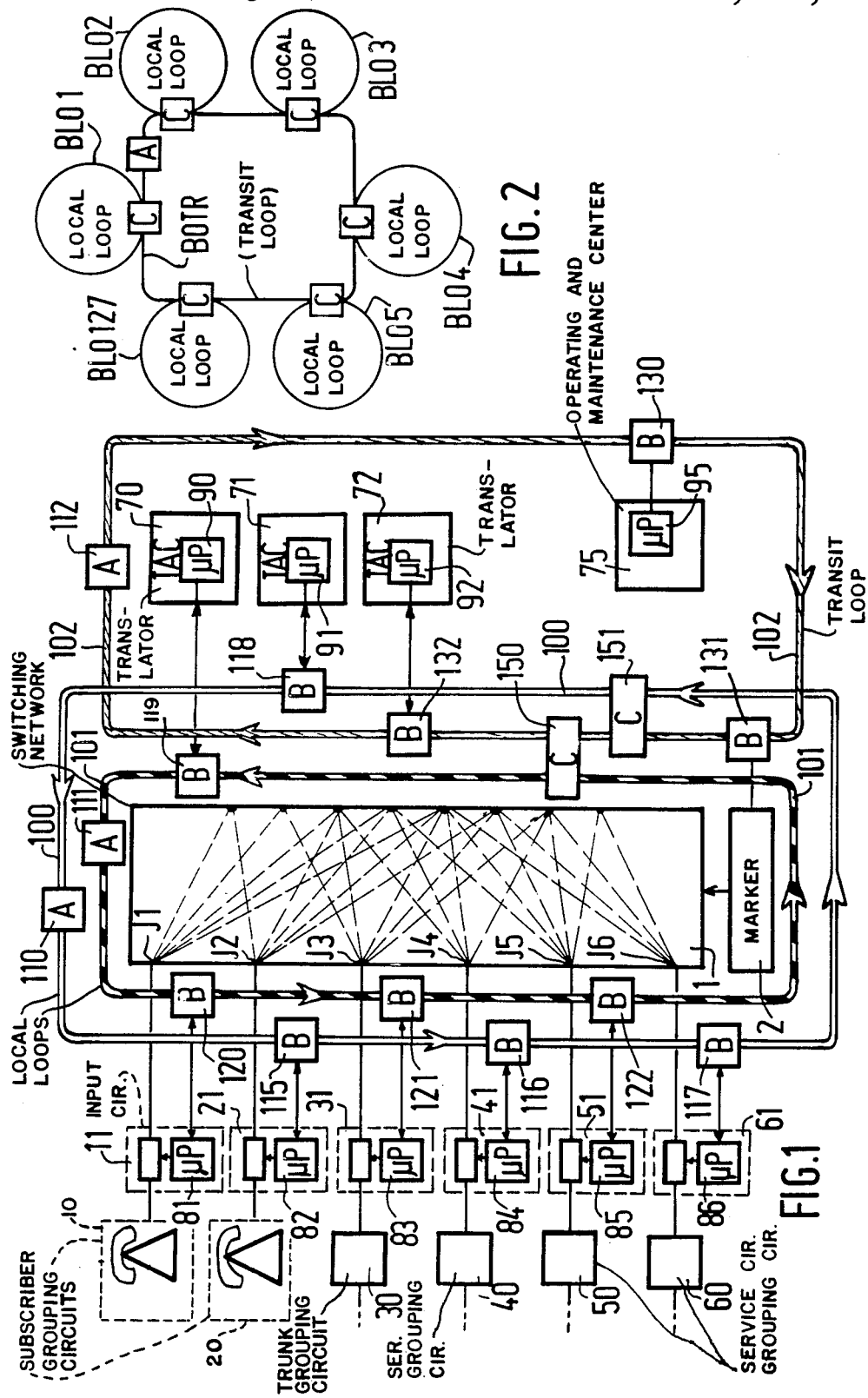

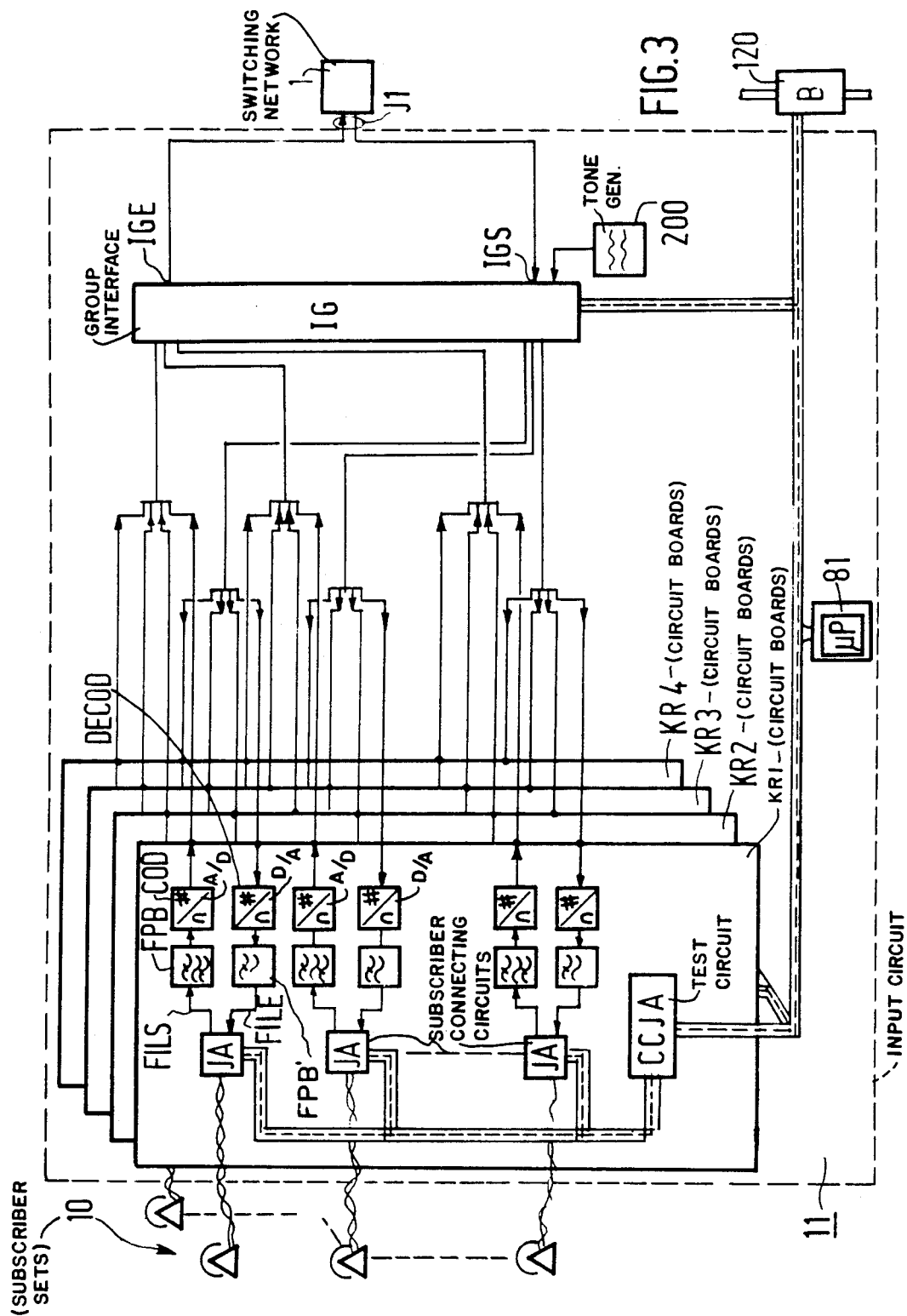

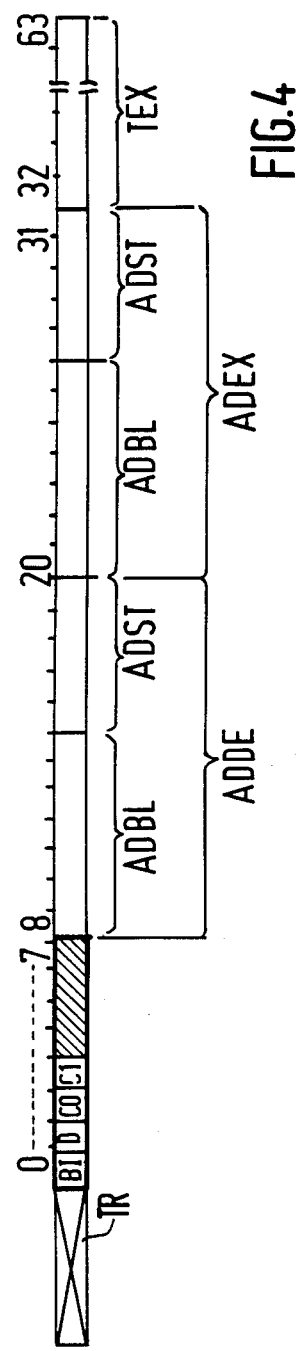
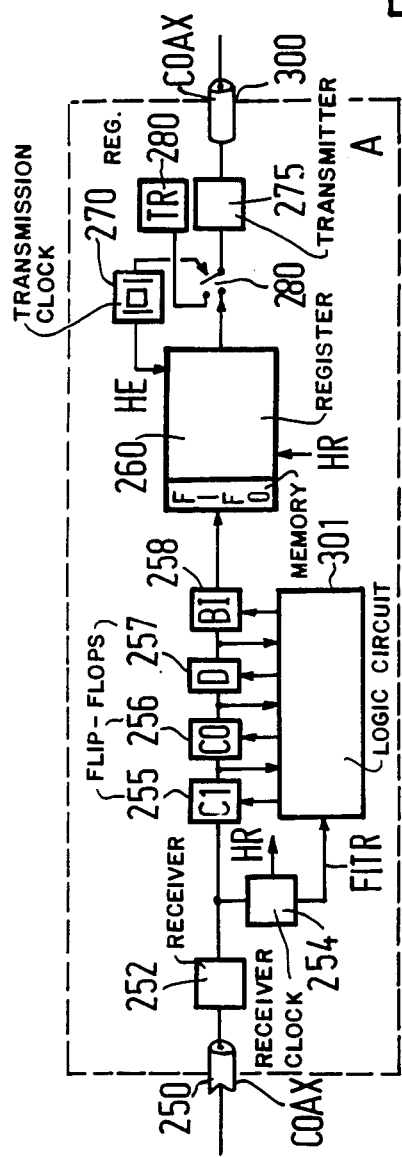
FIG.4
FIG.5

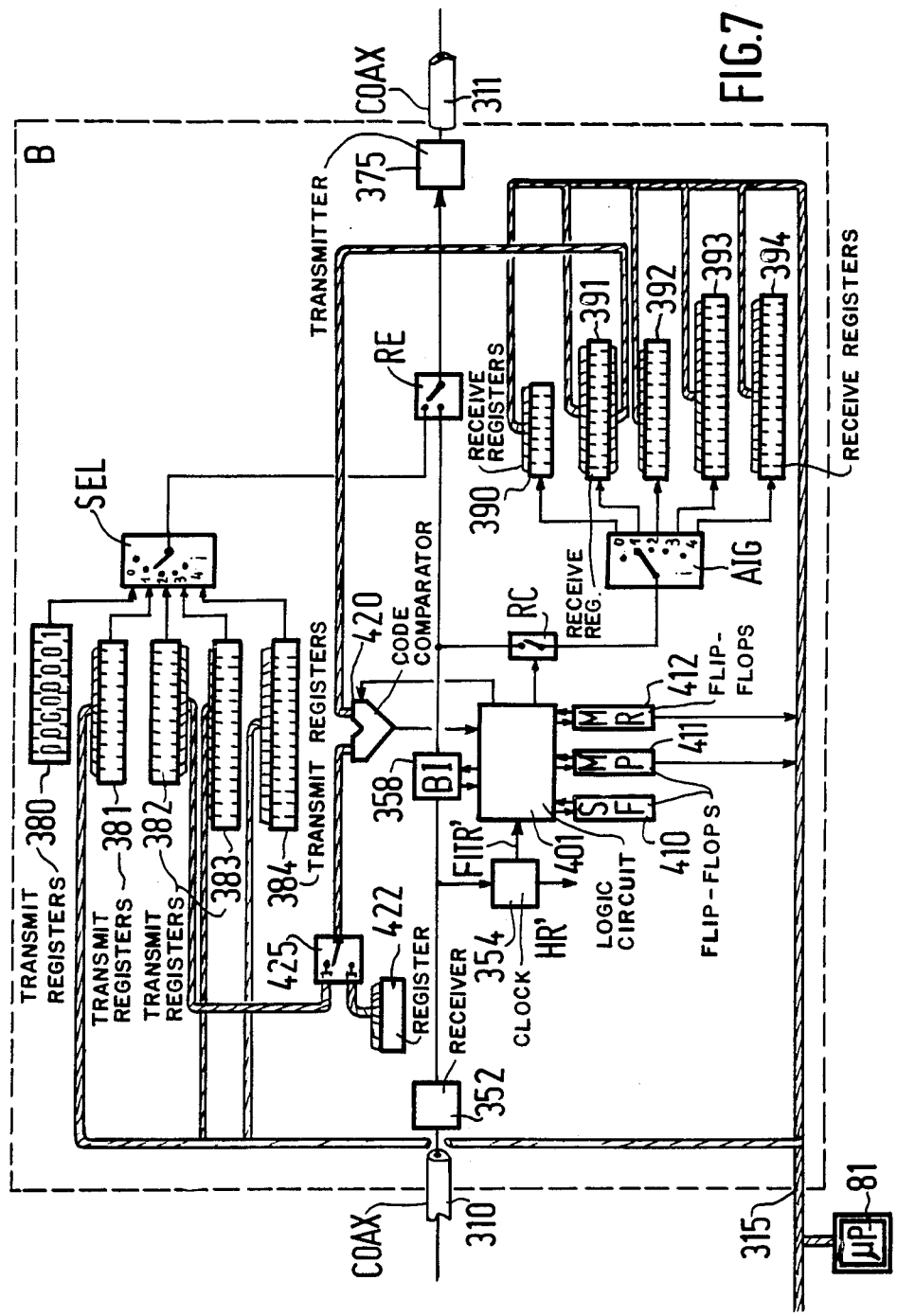

TELEPHONE SWITCHING SYSTEM

BACKGROUND OF THE INVENTION

1. Field of the Invention

The invention relates to a telephone switching system formed on the basis of a switching network designed to switch message information by interconnecting input circuits equipped with programmed-logic units, called input units, while connecting circuits are fitted between these programmed-logic circuits in order to transmit control information.

A system of this kind is described particularly in U.S. Pat. Nos. 4,201,889, 4,201,890 and 4,201,891, all issued May 6, 1980.

2. Description of the Prior Art

In this known system the connecting circuits between the programmed-logic units use the switching network which thus carries simultaneously message information and control information. The establishment of a call between two subscribers connected to the switching network via input circuits involves the exchange of control information between the input units connected to both subscribers: the calling subscriber and the called subscriber. Since the memories forming part of the input units have a limited capacity, ancillary programmed-logic units have to be brought in. To set up a call between a calling subscriber and a called subscriber it is therefore necessary to exchange between different units a stream of control information which utilises the switching network. This switching network is made up of switching elements, also equipped with logic units, which have to effect processing in order to determine the route to be followed within the switching element. Since the establishment of a connection by the switching network involves several switching elements, the processing time and the transmission time will be lengthened as a function of the number of switching elements used. It will thus be appreciated that the establishment of connections between input units at either end takes a certain time, which leads to a first disadvantage of this known system. This first disadvantage is formed by the fact that the establishment of calls takes too much time while busying the switching network. A second disadvantage which is also due to this certain time is that the reloading of the program of the input units takes too long. In fact, the input units have their program loaded in random-access or direct-access memories (RAM's) and, in the event of failure, these memories have to be reloaded via the switching network. Since programs can be fairly bulky and there are numerous memories to be reloaded, the reloading time may become unacceptable.

SUMMARY OF THE INVENTION

As a means of overcoming these disadvantages, a system of the kind mentioned in the preamble is remarkable for the fact that the connecting circuits are formed by loops, in particular Pierce loops, in which switching-network control circuits are inserted.

A description of loops of this kind will be found in U.S. Pat. No. 3,710,026, issued Jan. 9, 1973 and also in the Bell System Technical Journal for July-August 1972, in an article by J. R. Pierce, "Network for Block Switching of Data". The loops described therein are also described in U.S. Pat. No. 3,731,002, issued May 1, 1973, to J. R. Pierce, from which the name "Pierce loop" derives.

A first advantage provided by the invention is that it is no longer necessary to have switching elements incorporating programmed-logic units, which simplifies the equipment.

A second advantage is that the time required to transmit a communication between two terminals in the network is clearly defined.

A third advantage is that it is possible to supervise the various programmed-logic units continuously.

The following description, prepared with reference to the attached drawings, the whole being given by way of example and not being exhaustive, will facilitate understanding of how the invention can be embodied.

DESCRIPTION OF THE DRAWING

FIG. 1 shows a switching system in accordance with the invention.

FIG. 2 shows the arrangement of the loops.

FIG. 3 shows a detail of the embodiment of the system represented in FIG. 1.

FIG. 4 shows the arrangement of the frames transmitted in the loops.

FIG. 5 shows a method of construction of a type A box.

FIG. 7 shows the method of construction of a type B box.

DESCRIPTION OF THE PREFERRED EMBODIMENTS

Figure 6:
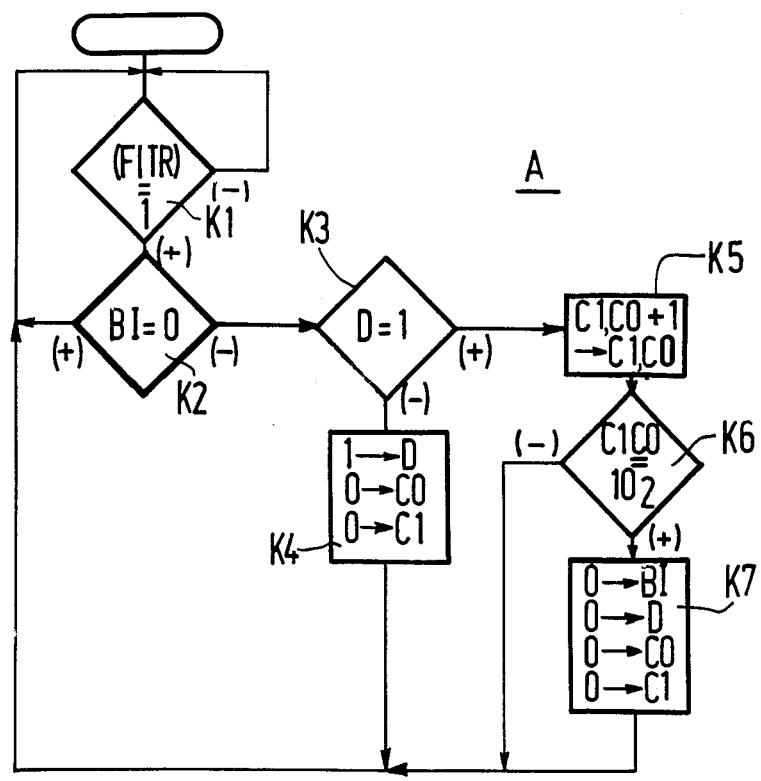
FIG. 6 shows a flowchart representing the operation of the box shown in FIG. 5.

FIG. 1 represents a switching system in accordance with the invention. Switching network 1 is capable of switching in time and in space the data present at its inputs J1, J2, J3, . . . , J6. These switching operations are effected under the control of a marker circuit 2. A first subscriber-grouping circuit 10 is connected to input J1 via an input circuit 11 and a second subscriber-grouping circuit 20 is connected to input J2 via an input circuit 21. A first trunk-circuit grouping circuit 30 is connected via an input circuit 31 to input J3 and a second trunk-circuit grouping circuit 40 is connected to input J4. A first service-circuit grouping circuit 50 is connected to input J5 via an input circuit 51 and a second service-circuit grouping circuit 60 is connected to input J6 via an input circuit 61. The system also incorporates two subscriber and circuit translators 70 and 71 and a bundle, routing and metering translator 72, and also an operating and maintenance centre 75. The various input circuits 11, 21, 31, 41, 51 and 61 each incorporate a programmed-logic unit, namely 81, 82, 83, 84, 85 and 86, respectively. Similarly, translators 70, 71, and 72 and centre 75 incorporate programmed-logic units, namely 90, 91, 92 and 95 respectively. To enable this system to function, it is important to provide connecting circuits to permit the exchange of control information between the various programmed-logic units.

According to the invention, these connecting circuits are formed by Pierce loops 100, 101 and 102, in one of which (loop 102) the marker circuit 2 of network 1 is inserted (sometimes referred to as the switching-network control circuit). The Pierce loops include three kinds of elements: boxes A, B and C.

The control information transmitted by these loops take the form of data blocks.

A-boxes are intended for the synchronisation and generation of time intervals for these data blocks. Only one A-box per loop is necessary; loop 100 is equipped with one A box 110, loop 101 with a box 111 and loop 102 with a box 112.

B-boxes permit the insertion and extraction of circuit units in and from loops, loop 100 incorporating B boxes 115, 116, 117 and 118, which permits connection with the programmed-logic units 82, 84, 86 and 91, respectively; B-boxes 119, 120, 121, and 122 of loop 101 permit the connection of units 90, 81, 83 and 85 respectively, while B-boxes 130, 131 and 132 of loop 102 permit the connection of unit 95, the marker circuit 2 and unit 92, respectively.

The C-boxes have a branching function; the C-box 150, for example, makes it possible, for certain circuit units, to switch from loop 101 to loop 102 and vice versa, while C-box 151 interconnects loops 100 and 102.

One of the characteristics of the invention is that the loops are arranged in hierarchical networks, which means that two kinds of loops can be distinguished: local loops and transit loops. A telephone switching system in accordance with the invention will comprise a single transit loop and a multitude of local loops. In FIG. 1 loop 102 serves as the transit loop for interconnecting the two local loops 100 and 101. More generally, however, as shown in FIG. 2, a transit loop BOTR may serve to interconnect a large number, for example 127, local loops BL01, BL02, BL03, BL04, BL05, ..., BL0127. These loops are each connected to the transit loop BOTR by a branching box C.

Each local loop has its own subscriber and service translator. Translator 70 is connected to loop 101 and translator 71 to loop 100. The bundle and routing translator bearing the item number 72 and the operating and maintenance centre bearing the item number 75 are connected to the transit loop 102.

Shown in detail in FIG. 3 is the configuration of the subscriber-grouping circuit 10 and the input circuit 11. Circuit 10 is in fact a group of thirty subscribers' sets which are connected to circuit 11. Circuit 11 comprises a set of four boards KR1, KR2, KR3 and KR4. Boards KR1 and KR2 are connected to eight subscribers while both KR3 and KR4 are connected to seven, leaving two space positions. Each subscriber is connected to a subscriber's connecting circuit JA of a type described at the National Telecommunication Conference, held at the Shamrock Hilton Hotel, Houston (Tex.), from 30th Nov. to 4th Dec. 1980; see pages 56.2.1 to 56.2.5. of the Proceedings. The various functions of the circuits are controlled by the programmed-logic units. Various checks can be carried out on these connecting circuits by a test circuit CCJA, a technique which is quite familiar to telephone engineers (see the article in L'onde Electrique for November 1982, entitled "Joncteurs d'abonné intégrés" by G. Ferrieu et al.). A wire FILS one end of which is connected to the subscriber's connecting circuit JA, transmits the speech signals originated by the subscriber while another wire, FILE, transmits the speech signals intended for the subscriber. The other end of the FILS wire is connected to the input of a low-pass filter FPB whose output is connected to the input of an analogue-digital converter COD; the output of converter COD is connected to an input of the group interface IG; the information leaving at output IGE of the group interface IG represents a time-division multiplex frame which can accommodate all the speech information to and from the 30 subscribers. Input J1 of switching network 1 accepts this information and also delivers information in time-division multiplex form at input IGS of interface IG which allocates them to the various subscribers. Information presented in digital form for a subscriber is converted into analogue form by the digital-analogue converter DECOD; the output signal from this decoder is filtered by a low-pass filter FPB' before being forwarded to the FILE wire connected to connecting circuit JA. A tone generator 200 (dial tone, ringing tone, busy, etc.) which is connected to interface IG to enable these tones, coded in digital form, to be injected into the time interval (or time slot) of the multiplex frame allocated to the subscriber concerned. For a description of an interface of this kind, see the article: "Design of a Digital Exchange" by J. M. Cotton and D. A. Lawson, published in volume 3, no. 1, for February 1980 of the journal Computer Communications.

It is now proposed to show how the invention makes it possible to set up a call between two subscribers by means of blocks of control data circulating in loops 100, 101 and 102. FIG. 4 shows the structure of the blocks. A block is preceded by a frame code TR. The first eight binary digits which follow form a test octet; of the binary digits in this octet only the meaning of the first four will be given, namely:

the binary position 0 marked B1 indicates if the frame is free or busy;

the binary position 1 marked D indicates a flag;

and the binary positions 2 and 3 marked C0 and C1 form a counter.

The purpose of this test octet will be explained more clearly below.

After this test octet, twelve binary digits are allocated to the called subscriber and form the word ADDE and the next twelve digits are assigned to the calling subscriber to form the word ADEX. The word ADEX defines the address of the B-box from which the block is emitted and the word ADDE defines the address of the B-box for which the block is intended; the word ADEX is formed from two words ADBL and ADST. ADBL defines the address or the number of the loop to which te originating B-box belongs and the word ADST its address or number on that loop. Similarly, the word ADDE is formed from two words ADBL and ADST which have the same meaning as the preceding ones, but relate to the receiving B-box. The following thirty-two binary digits TEX are chiefly used for control codes. Furthermore, since several subscribers (or circuits) are connected to the B-boxes, each of these subscribers or circuits has allocated to it a supplementary address code AT which may be contained, if necessary, in the thirty-two binary digits TEX. In the example described:

the code ADBL is formed by seven binary digits;
the code ADST is formed from five binary digits; and
the code AT is formed from five binary digits.

The following codes should be noted:
the ADST code for translators TAC is 00000, the ADBL code for the transit loop 102 is 0000000, and the ADST code for the marker circuit 2 is 00000.

Since the latter is located on the transit loop, its address is:

00000000000.

The circuit diagram of an A-box is shown in detail in FIG. 5. The information conveyed over the loop via the coaxial cable COAX arrives at input 250 of the A-box, a receiver 252 amplifies the signals received and shapes them for processing. A clock circuit 254 supplies various signals: in particular, it delivers via a wire FITR and active "1" signal as soon as the frame code is detected and via a wire HR a clock signal at the rate with which binary elements appear, so that the binary digits marked C1, Co, D and B1 are contained in the flip-flop 255, 256, 257 and 258 which are incorporated in a shift register; the input of this register is connected to the output of receiver 252 and its output is connected to the input of a variable buffer register 260 which may consist of a memory known as a FIFO memory. This memory is therefore filled up at the rate of the clock circuit 254 and it is emptied at the rate of a transmission clock 270. The output of the FIFO memory is connected to the input of the transmitter circuit 275 via a switch 280. This switch, controlled by the transmission clock 270, permits the injection of the frame code TR contained in a register 280. The output of transmitter 275 forms the output 300 of the A-box. A logic circuit 301 controls the operation of this A box. For that purpose it is connected to the wire FITR and to the outputs of flip-flops 255, 256, 257 and 258. Furthermore, it can control the state of these flip-flops. FIG. 6 shows an operational flowchart which is made up of several blocks or panels. Block K1 represents a test for deciding if the frame code signal FITR is active or not. We will move on to block K2 only if that signal becomes active; if the frame is free, B1=0, no action need to be taken and we return to block K1; if it is occupied, we move on to block K3 where the flag D is tested; if the latter is not equal to 1, we move on to block K4 where we put this flag to 1 and set the binary elements C0 and C1 to zero. To that end, flip-flop 257 is set to "1" and flip-flops 256 and 255 to zero. We then return to block K1. If the flag tested at block K3 is equal to "1" we add "1" to the binary number formed by the binary elements C1 and C0 contained in flip-flops 255 and 256. Then, at block K6, we test if this binary number is equal to 3 or "10" with a binary base; if the result is "no", we return to block K1, if it is "yes", we move on to block K7. At block K7, the operations indicated consist in resetting (to zero) all the flip-flops 255, 256, 257 and 258 so that the binary digits B1, D C0 and C1 become equal to "0". The result thus is that an occupied block which passes through the A box three times will be released.

FIG. 7 shows in detail how B-boxes, e.g. box 120, are constructed. These boxes have an input 310 and an output 311 for connection of the cable COAX forming the loop, and also an input 315 for the programmed-logic unit 81. This input permits the passage of the various buses (address bus, data bus, control bus, etc.) of the microprocessor forming part of unit 81. A receiver 352 amplifies the received signals and shapes them for processing. A clock circuit 354 connected to the output of receiver 352 delivers signals over various wires, particularly on a wire FITR' on which an active "1" signal appears as soon as the frame code is detected and, over a wire HR', signals at the rate of appearance of the binary digits. The output of receiver 352 is also connected to the input of a flip-flop 358 whose output is connected to the input of a transmitter 375 via a switch RE. The output of the transmitter forms the output 311 of the B box. Via this switch RE, it is possible to transmit at output 311 a whole block whose data are contained in registers 380, 381, 382, 383 and 384. Register 380 contains the test octet, register 381 the code ADDE, register 382 a code ADEX, and registers 383 and 384 the set of codes TEX. These registers are loaded in parallel by the microprocessor 81 and may be emptied in series at the rate of the clock signals of circuit 354. This emptying in series is effected via a switch SEL cooperating with the switch RE. A set of registers 390, 391, 392, 393 and 394 has also been incorporated to register an entire block from the receiving end. Register 390 has sufficient capacity to contain the test octet, and registers 391, 392, 393 and 394 sufficient to contain respectively the code ADDE, the code ADEX, a part of TEX and the other part of TEX. These registers are loaded via a switch AIG and a switch RC which are connecting the line linking the receiver to the transmitter, at the output of flip-flop 358 and the inputs of the registers 390–394. The contents of registers 390 and 394 are read out by the programmed-logic unit 81. The transmission of the blocks contained in registers 380 to 384 and the recording of the blocks in registers 390 to 394 are controlled by the logic circuit 401 to which are connected, in addition to flip-flop 358, flip-flops 410, 411 and 412. These flip-flops are intended to contain the information SF, MP and MR whose meanings are as follows:

SF=1 indicates that a block has been transmitted;
MP=1 indicates that a block has to be transmitted;
MR=1 indicates that a block is registered in registers 390 to 394 and is intended for unit 81.

It will be noted that flip-flops 411 and 412 are connected to unit 81. Logic circuit 401 also uses the output signal from a code comparator 420 which compares the contents of receive register 391 either with the "frozen" contents of a register 422 containing the ADDE code appropriate to the B-box in question or with the contents of transmit register 382. The choice is made by selecting the position of a switch 425.

Figure 8:
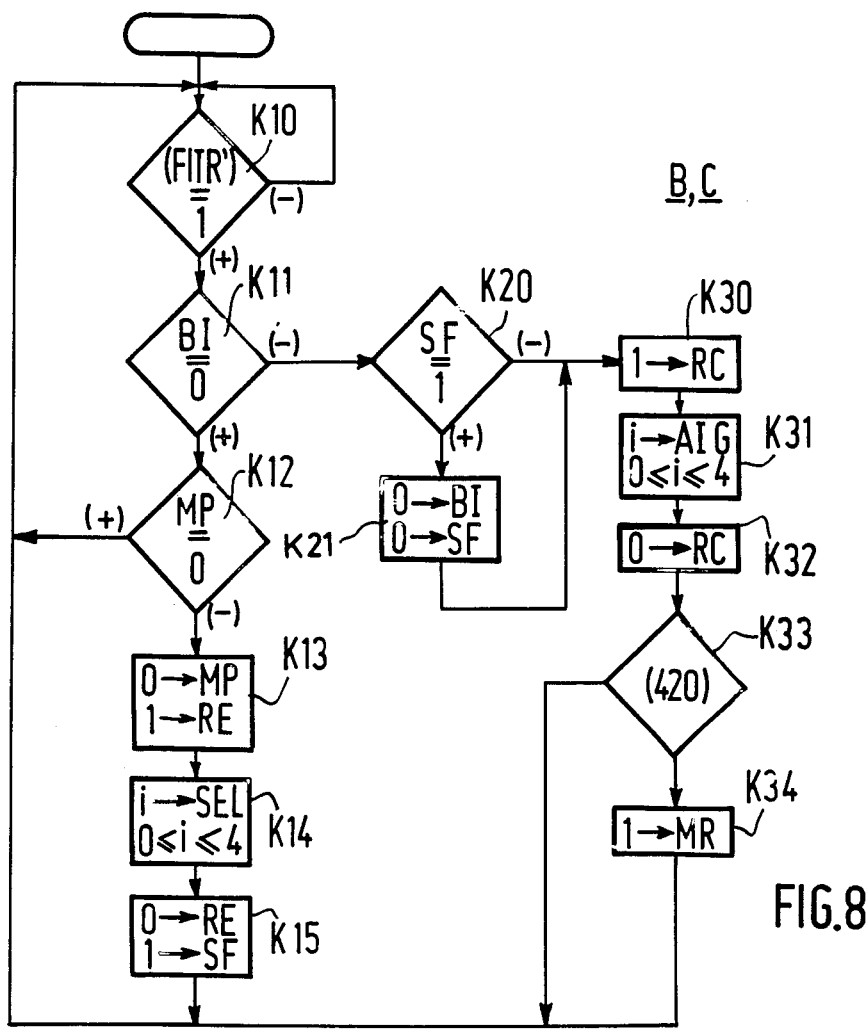
FIG. 8 shows a flowchart representing the operation of the box shown in FIG. 7.

The operation of logic circuit 401 will now be explained with the aid of the flowchart in FIG. 8.

Block K10 indicates the testing of the FITR' wire to determine if the frame code is detected. As soon as the latter is detected, we pass on to block K11 which indicates the test by flip-flop 358; this test determines whether the block received is occupied or not. If the block is free (B1=0), we pass on to block K12 where flip-flop 411 is tested to determine whether unit 81 has filled registers 380 to 384 with a view to transmitting a frame; if that is the case, unit 81 has set flip-flop 411 to "1" so that MP≠0, and we move on to block K13. If it is not the case, MP=0 and we return to block K10. At block K13 we reset flip-flop 411 to zero and operate switch RE so that the input of the transmitter is connected to the output of switch SEL; then (in block K14) we select the position of this switch SEL for the contents of registers 380 to 384 to be transmitted into the loop. When this transmission is ended, switch RE is reset to its initial position so that the input of the transmitter 375 is connected to the output of flip-flop 358 and flip-flop 410 is set to "1" (block K15). We now return to block K10.

If it has been observed at block K11 that the frame is occupied, we then pass on to block K20 where flip-flop 410 is tested to determine whether the frame is occupied by data emanating from this particular box; if that is the case, with SF=1, we pass on to block K21 to set flip-flops 358 and 410 to zero, thus releasing the block, and we then move on to block K30. If SF=0, we have to ensure that the incoming frame is recorded in registers 390 to 394. To do so, we set switch RC to the closed position (block K30) and select the positions of switch AIG (block K31). When these operations are completed, we set switch RC to the open position (panel K32). In block K33 we check for identity between the code ADDE contained in register 391 and the code ADEX contained in register 382. If there is identity, flip-flop 412 (block K34) is set to "1", which means that unit 81 has to read out the contents of registers 390 to 394. If identity does not exist, we return to block K10.

Figure 9:
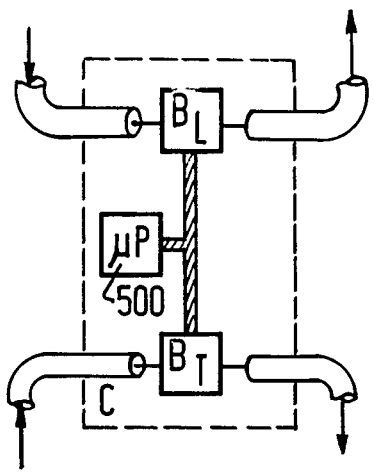
FIG. 9 shows the method of construction of a type C box.

FIG. 9 shows the structure of a C-box. It is formed from two B boxes. One of these boxes is distinguished by the letters BL; this is the box arranged on a local loop. The other is called BT and is the box inserted in the transit loop. The exchange of information between these two loops is effected by a programmed-logic unit 500. It should be noted that for these boxes BL and BT the other position of the switch 425 in the B box circuit shown in FIG. 7 has to be used. That is to say, for both the box BL and the box BT, the code comparator unit 420 compares the originating loop address code ADBL stored in receive register 391 (comprised in the code ADDE) with the address code of the local loop stored in register 422. However, the test indicated in block K33 should be interpreted as follows:

(a) In the case of box BL, we move from block K33 to block K34 if the ADBL code of ADDE is different from the code for the address of the local loop contained in register 422.

(b) In the case of box BT, we move from block K33 to block K34 if the ADBL content of ADDE is identical to the code for the address of the local loop contained in register 422.

How the procedure for establishing a call between two subscribers respectively forming part of grouping circuits 10 and 20 takes place is explained below with reference to FIG. 1. The subscriber in group 10, referred to herein as subscriber AA, is supervised by unit 81; and the subscriber in group 20, referred to herein as subscriber BB, is supervised by unit 82.

Subscriber AA lifts his receiver; this fact is signalled to unit 81 which causes the transmission, in loop 101, of a block of control data. This block of control data is a reservation step for subscriber AA whose supplementary address is noted as AT (AA). This message is sent to unit TAC 70 of loop 101, which will change subscriber AA from the free state to the reserved state. Next, the unit 70 sends back to box B 120 the confirmation that subscriber AA is reserved and together with, additionally, the class COS (AA) of this subscriber (the class represents the facilities to which he is entitled: access to the trunk network, conferences, etc.).

The first three digits DG1, DG2 and DG3 which subscriber AA dials are then sent to a translator; these three numbers will determine the address of the loop which serves subscriber BB. Then the four other digits DG4, DG5, DG6 and DG7 are sent to the translator of subscriber BB's loop; in this example, this is translator 71; the latter then sends back to box 120 all the data concerning the address of subscriber BB, thus indicating that from now on, subscriber BB has changed to the reserved state.

Another block of control data is the call request made by box 120 for box 115 serving subscriber BB. Box 115 then signals this request to translator 71 to place the subscriber in the busy state. Translator 71 transmits this change of state to translator 70 in order to put subscriber AA likewise in the busy state, line 9. Translator 70 transmits confirmation of the busy condition of subscribers AA and BB to box 10. Box 120 then sends marker circuit 2 the order to connect AA and BB. Once this connection is effected, the marker gives box 115 the order to ring subscriber BB. Then box 115 sends box 120 the order to send ringing tones to subscriber AA. When subscriber BB lifts his receiver, box 115 sends this information to box 120 which confirms this fact; the call has now been set up.

We now consider the situation when the call between subscribers AA and BB ends.

We will assume that subscriber AA hangs up; this is detected at box 120 which signals the fact to box 115. Box 115 then gives the order to the translator 71 to put subscriber BB in the cleared condition; then translator 71 requests translator 70 to put subscriber AA in the cleared condition. Translator 70 informs box 120 that subscribers AA and BB are in the cleared condition; box 120 can now send marker circuit 2 the order to disconnect subscribers AA and BB. With line 21 the marker circuit signals to box 115 that subscriber BB is disconnected (from subscriber AA), and box 115 sends box 120 the information that it has to consider subscriber AA as disconnected. Box 120 requests translator 70 to place subscriber AA in the free condition. The translator confirms this fact. Additionally, box 115 requests its translator to return subscriber BB to the free condition and this is confirmed back to it.

It will now have been understood that each subscriber can have four states or conditions which are arrived at cyclically:

the free state, which means that he can be called;

the reserved state, which means that he is involved in a call but that the latter has not yet been set up, the busy state, which means that he is engaged on a conversation; and the cleared state, which means that the subscribers have ended their conversation but the connection between them is still in existence inside network 1.

Figure 10:
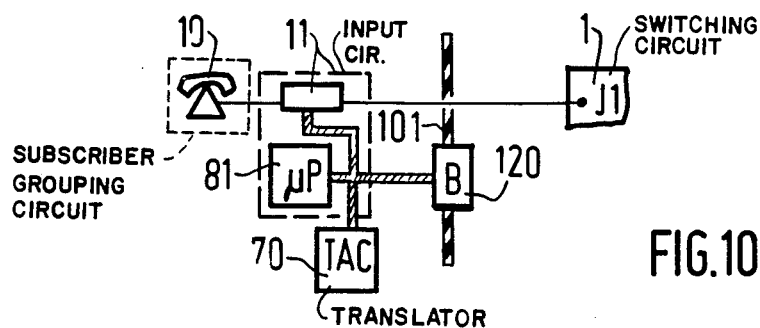
FIG. 10 shows a possible variation in the embodiment of a telecommunication system in accordance with the invention.

FIG. 10 shows a variation on the embodiment of a switching system in accordance with the invention. With this variation, the translator circuit, e.g. circuit 70, can be connected to a B box, box 120; a single programmed-logic unit will then control input circuit 11 and this translator 70.

What is claimed is:

1. A telephone switching system comprising: a plurality of input circuits respectively provided with programmed-logic units; a switching network for switching message information between said input circuits; a plurality of connecting circuits in the form of Pierce loops connecting said input circuits to said switching network, the input circuits being adapted to transmit information for controlling the switching network to the connecting circuits; and a marker circuit connected to the switching network and comprised in at least one of the connecting circuits; the remaining connecting circuits being adapted to further transmit the control information received thereby to said one connecting circuit and said one connecting circuit being adapted to further transmit the control information received thereby to said marker circuit; and said marker circuit being adapted to control the switching network in accordance with the control information transmitted to it by said one connecting circuit.

2. A telephone switching system as claimed in claim 1, wherein said one connecting circuit is a transit loop and the remaining connecting circuits are local loops, the transit loop linking the local loops.

3. A telephone switching system as claimed in claim 2, wherein a bundle, routing and metering translator is comprised in the transit loop.

4. A telephone switching system as claimed in claim 2 wherein a local subscriber and circuit translator circuit is comprised in each local loop.

5. A telephone switching system as claimed in claim 4, wherein the subscriber and circuit translator circuit comprised in each of the local loops forms part of an input circuit and is controlled by the programmed-logic unit comprised in such input circuit.

6. A telephone switching system as claimed in claim 1 wherein the control information is in the form of blocks of data comprising binary control digits, a called-subscriber address code, a calling-subscriber address code, an order code, and special codes for defining subscriber circuits connected to the input circuits.

7. A telephone switching system as claimed in claim 6 in which the Pierce loops incorporate boxes of a first type ("A boxes") for the synchronization and generation of time intervals for blocks of control data, boxes of a second type ("type B boxes") for the insertion and extraction of blocks of control data into and from said loops, and boxes of a third type ("type C boxes") for branching functions between two loops.

8. A telephone switching system as claimed in claim 7, wherein said type B boxes are connected to respective ones of said programmed-logic units and each B box comprises: receiving registers for recording a received block of control data; transmission registers for storing a block of control data to be transmitted; and a logic unit for signalling to the programmed-logic unit to which the B box is connected that a received block of control data recorded in the receiving registers is intended for it and for transmitting to said programmed-logic unit the block of control data stored in the transmission registers.

9. A telephone switching system as claimed in claim 8, wherein a type C box is formed by two type B boxes coupled by a programmed-logic unit.

* * * * *